(12) United States Patent
Isobe

(10) Patent No.: US 8,144,272 B2
(45) Date of Patent: Mar. 27, 2012

(54) DISPLAY DEVICE

(75) Inventor: Hiroaki Isobe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 313 days.

(21) Appl. No.: 12/596,648

(22) PCT Filed: Feb. 7, 2008

(86) PCT No.: PCT/JP2008/000167
§ 371 (c)(1),
(2), (4) Date: Oct. 19, 2009

(87) PCT Pub. No.: WO2008/142817
PCT Pub. Date: Nov. 27, 2008

(65) Prior Publication Data
US 2010/0110326 A1    May 6, 2010

(30) Foreign Application Priority Data

May 23, 2007   (JP) ................. 2007-136275

(51) Int. Cl.
*G02F 1/1335* (2006.01)
*G02F 1/1347* (2006.01)

(52) U.S. Cl. .......................... 349/12; 349/74

(58) Field of Classification Search .................... 349/12, 349/74
See application file for complete search history.

(56) References Cited

U.S. PATENT DOCUMENTS 6,016,134 A     1/2000 Ota
2006/0262236 A1* 11/2006 Abileah ................ 349/12

FOREIGN PATENT DOCUMENTS

| JP | 1-81634 U | 5/1989 |
|---|---|---|
| JP | 8-146392 A | 6/1996 |
| JP | 9-251159 A | 9/1997 |
| JP | 2001-91926 A | 4/2001 |
| JP | 2004-117701 A | 4/2004 |
| JP | 2006-337786 A | 12/2006 |

* cited by examiner

*Primary Examiner* — James Dudek
(74) *Attorney, Agent, or Firm* — Birch, Stewart, Kolasch & Birch, LLP

(57) ABSTRACT

A display device includes: a display panel having a display region for displaying an image; a functional panel positioned so as to face the display panel; and an interposed member provided outside the display region so as to be interposed between the display panel and the functional panel, wherein an optical sheet having predetermined optical characteristics is provided on at least one surface between the display panel and the functional panel so as to overlap the display region, and the interposed member is provided along a sidewall of the optical sheet.

11 Claims, 2 Drawing Sheets

DISPLAY DEVICE

TECHNICAL FIELD

The present invention relates to display devices. More particularly, the present invention relates to display devices formed by a plurality of panels.

BACKGROUND ART

In recent years, liquid crystal display (LCD) devices having a functional panel, such as a touch panel, on the front surface of an LCD panel, has been widely used.

For example, Patent Document 1 discloses an LCD device in which two LCD panels, each having a liquid crystal layer interposed between a pair of transparent substrates, are laminated together, where both panels are bonded together outside a display region. Patent Document 1 describes that this structure improves shock resistance even without holding the panels by a housing, and that, since no adhesive layer enters the display region, the problems of the color and air bubbles of an adhesive can be eliminated.

Moreover, Patent Document 2 discloses an LCD device including: an LCD portion having a first transparent substrate, and a second transparent substrate formed on the first transparent substrate, with a liquid crystal layer enclosed therebetween; and a touch switch (a touch panel) having a third transparent substrate having a transparent electrode formed on its surface, and a fourth transparent substrate having a transparent electrode formed on its surface, with the third transparent substrate and the fourth transparent substrate being positioned so that their respective surfaces face each other, where the touch switch is formed on the LCD portion with a cushioning material interposed therebetween. Patent Document 2 describes that, with this structure, even if the touch switch is entirely bent to some degree due to the pressure applied upon input, the bending due to the pressure is buffered by the cushioning material, whereby the bending can be prevented as much as possible from spreading down to the liquid crystal layer in the LCD portion located in a layer under the touch switch.

Moreover, Patent Document 3 discloses an LCD device including: an LCD panel in which two opposing glass substrates, each having a transparent electrode, an alignment film, and the like provided thereon, are fixedly bonded to each other by a sealing material, and a liquid crystal layer is enclosed between the substrates; and a touch switch (a touch panel) foamed by a transparent substrate, and provided on the display surface side of the LCD panel, where the touch switch has an upper transparent substrate having a transparent electrode formed on its surface, and a lower transparent substrate having a transparent electrode formed on its surface, both transparent substrates are positioned so that their respective surfaces face each other with a spacer interposed therebetween, an antireflection treated film is provided on the lower surface side of the lower transparent substrate, and the antireflection treated film and an upper polarizer of the LCD panel are bonded together with a cushioning material interposed therebetween. Patent Document 3 describes that, with this structure, even if the touch switch is bent by the pressure applied upon input, the touch switch does not contact the LCD panel, and the bending can be prevented as much as possible from spreading down to the liquid crystal layer.

Patent Document 1: Japanese Published Utility Model Application No. H01-81634
Patent Document 2: Japanese Published Patent Application No. H08-146392
Patent Document 3: Japanese Published Patent Application No. 2001-91926

DISCLOSURE OF THE INVENTION

Problems to be Solved by the Invention

Incidentally, when fixing a functional panel, such as a touch panel, to the front surface of an LCD panel, as described in Patent Documents 1 through 3, the LCD panel and the functional panel are often bonded together by a double-sided adhesive tape or the like which is positioned outside a display region thereof. However, since the thermal expansion coefficient of an acrylic adhesive, a PET (polyethylene terephthalate) base material or a nonwoven base material, or the like of the double-sided adhesive tape is higher than that of glass substrates of the LCD panel and the touch panel, the double-sided adhesive tape, which is positioned outside the display region as an interposed member between the LCD panel and the functional panel, can be extended and meander due to a temperature change, and can be positioned inside the display region.

The present invention was developed in view of the above problems, and it is an object of the present invention to prevent an interposed member positioned between a display panel and a functional panel from entering a display region.

Means for Solving the Problems

In order to achieve the above object, according to the present invention, an interposed member, which is positioned between a display panel and a functional panel, is provided along a sidewall of an optical sheet that is positioned so as to overlap the display region.

More specifically, a display device according to the present invention is a display device including: a display panel having a display region for displaying an image; a functional panel positioned so as to face the display panel; and an interposed member provided outside the display region so as to be interposed between the display panel and the functional panel, wherein an optical sheet having predetermined optical characteristics is provided on at least one surface between the display panel and the functional panel so as to overlap the display region, and the interposed member is provided along a sidewall of the optical sheet.

According to the above structure, the interposed member, which is provided outside the display region of the display panel so as to be interposed between the display panel and the functional panel, is positioned along the sidewall of the optical sheet that is provided on at least one surface between the display panel and the functional panel so as to overlap the display region. Thus, even if the interposed member is extended and meanders due to a temperature change, a sidewall of the interposed member contacts the sidewall of the optical sheet, whereby a region where the interposed member is movable is limited. Thus, since the region where the interposed member is movable between the display panel and the functional panel is limited to the outside of the optical sheet, that is, the outside of the display region, the interposed member, which is positioned between the display panel and the functional panel, can be prevented from entering the display region.

The functional panel may be a touch panel for detecting a touched position on the display panel, and the optical sheet may be a polarizer provided on a surface of the display panel.

According to the above structure, in an LCD panel having a touch panel as the functional panel, the interposed member is provided along a sidewall of the polarizer provided on the surface of the touch panel side of the LCD panel. Thus, even if the interposed member is extended and meanders due to a temperature change, the sidewall of the interposed member contacts the sidewall of the polarizer provided on the surface of the LCD panel, whereby the interposed member can be prevented from entering the display region.

The functional panel may be a viewing angle control panel for controlling a viewing angle of the display panel, and the optical sheet may be a polarizer provided on a surface of the viewing angle control panel.

According to the above structure, in a display panel having a viewing angle control panel as the functional panel, the interposed member is provided along a sidewall of the polarizer provided on the surface of the display panel side of the viewing angle control panel. Thus, even if the interposed member is extended and meanders due to a temperature change, the sidewall of the interposed member contacts the sidewall of the polarizer provided on the surface of the viewing angle control panel, whereby the interposed member can be prevented from entering the display region.

A polarizer may be provided as the optical sheet on a surface of the display panel.

According to the above structure, in an LCD panel having a viewing angle control panel as the functional panel, the interposed member is provided along a sidewall of the polarizer provided on the surface of the LCD panel side of the viewing angle control panel, and a sidewall of the polarizer provided on the surface of the viewing angle control panel side of the LCD panel. Thus, even if the interposed member is extended and meanders due to a temperature change, the sidewall of the interposed member contacts the sidewalls of the polarizers provided on the respective surfaces of the viewing angle control panel and the LCD panel, whereby the interposed member can be prevented from entering the display region.

The interposed member may be an adhesive layer for bonding the display panel and the functional panel together.

According to the above structure, even if, for example, an adhesive and a base material of the adhesive layer are extended due to a temperature change, and the adhesive layer meanders, a sidewall of the adhesive layer contacts the sidewall of the optical sheet, whereby the adhesive layer can be prevented from entering the display region.

The interposed member may be a spacer for holding the display panel and the functional panel with a predetermined gap therebetween.

According to the above structure, even if, for example, a base material of the spacer is extended due to a temperature change, and the spacer meanders, a sidewall of the spacer contacts the sidewall of the optical sheet, whereby the spacer can be prevented from entering the display region. Moreover, since the display panel and the functional panel are held by the spacer with the predetermined gap therebetween, generation of Newton rings can be suppressed in the display device. Note that the spacer may be formed by an adhesive layer with a predetermined thickness to hold the display panel and the functional panel with a predetermined gap therebetween.

A sidewall of the interposed member may be in contact with the sidewall of the optical sheet.

According to the above structure, the interposed member interposed between the display panel and the functional panel is in contact with the sidewall of the optical sheet. Thus, even if the interposed member is extended and meanders due to a temperature change, the interposed member merely moves outward in a direction away from the sidewall of the optical sheet provided so as to overlap the display region, and does not enter the display region.

Effects of the Invention

According to the present invention, since an interposed member, which is positioned between a display panel and a functional panel, is provided along a sidewall of an optical sheet that is positioned so as to overlap a display region, the interposed member can be prevented from entering the display region.

DESCRIPTION OF CHARACTERS

D display region
10 LCD panel
12b polarizer (optical sheet)
20a viewing angle control panel (functional panel)
20b touch panel (functional panel)
21 polarizer (optical sheet)
25 spacer (interposed member)
26a-26c adhesive layer (interposed member)
30a-30c LCD device

DETAILED DESCRIPTION OF EMBODIMENTS

Embodiments of the present invention will be described in detail with reference to the accompanying drawings. Note that, although an LCD device is described as an example of a display device in the following embodiments, the present invention is not limited to the following embodiments.

First Embodiment

Figure 1:
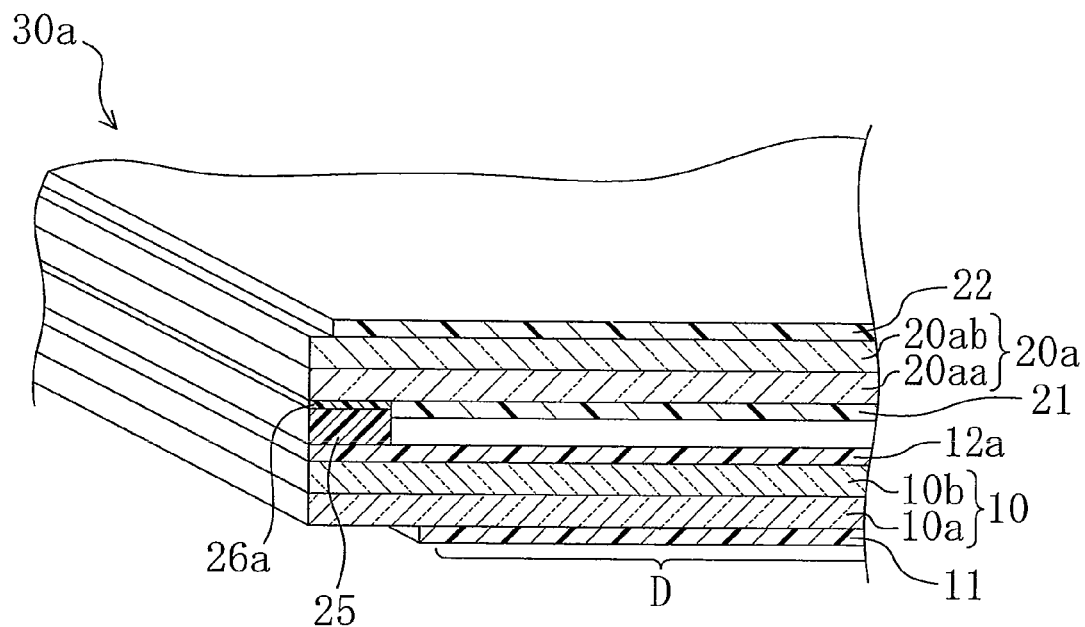
FIG. 1 is a perspective view showing a part of a cross section of an LCD device according to a first embodiment.
Figure 2:
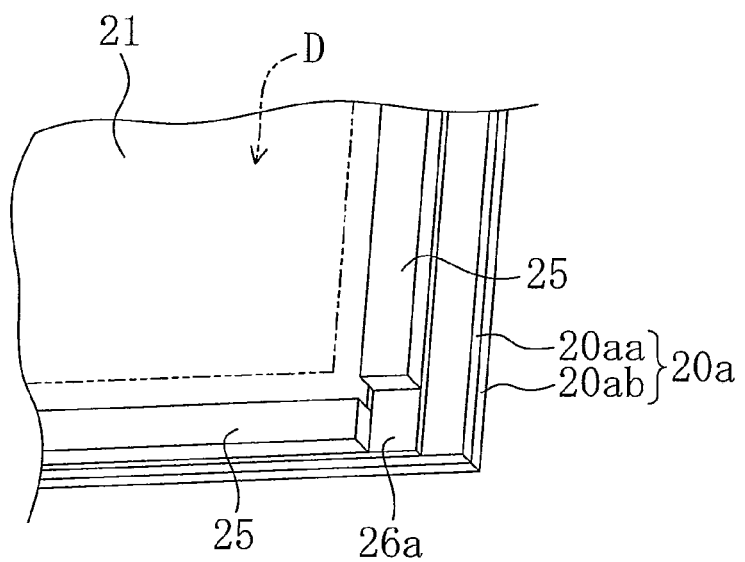
FIG. 2 is a perspective view of a viewing angle control panel of the LCD device when viewed from its bottom.

FIGS. 1 and 2 show a first embodiment of a display device according to the present invention. More specifically, FIG. 1 is a perspective view showing a part of a cross section of an LCD device 30a of the present embodiment, and FIG. 2 is a perspective view of a viewing angle control panel 20a of the LCD device 30a when viewed from its bottom.

As shown in FIG. 1, the LCD device 30a includes an LCD panel 10 having a display region D for displaying an image, a viewing angle control panel 20a positioned so as to face the LCD panel 10, and a spacer 25 provided outside the display region D so as to be interposed between the LCD panel 10 and the viewing angle control panel 20a.

The LCD panel 10 includes, for example, an active matrix substrate 10a and a counter substrate 10b, which are positioned so as to face each other, and a liquid crystal layer (not shown) provided between the substrates 10a and 10b.

The active matrix substrate 10a includes a plurality of gate lines (not shown) provided so as to extend parallel to each other over an insulating substrate such as a glass substrate, a plurality of source lines (not shown) provided so as to extend parallel to each other in a direction perpendicular to the gate lines, a plurality of thin film transistors (TFTs, not shown) provided as switching devices at each intersection of the gate lines and the source lines, a plurality of pixel electrodes provided respectively corresponding to the TFTs, and an alignment film (not shown) provided so as to cover the pixel electrodes.

The counter substrate 10b includes a color filter layer (not shown) provided on an insulating substrate such as a glass substrate, a common electrode (not shown) provided so as to cover the color filter layer, and an alignment film (not shown) provided so as to cover the common electrode.

The color filter layer includes a plurality of colored layers (not shown), each colored red, green, or blue, respectively corresponding to the pixel electrodes on the active matrix substrate 10a, and a black matrix (not shown) provided between the colored layers.

The liquid crystal layer includes a nematic liquid crystal having electro-optical characteristics.

As shown in FIG. 1, polarizers 12a and 11 for transmitting only polarized components of a specific direction therethrough are attached to the upper and lower surfaces of the LCD panel 10, respectively, so as to overlap the display region D.

In the LCD panel 10, the pixel electrodes on the active matrix substrate 10a and the colored layers on the counter substrate 10b are arranged in a matrix pattern to form the display region D for displaying an image.

Moreover, in the LCD panel 10, when, in each pixel formed by each pixel electrode, a TFT is turned on in response to a gate signal applied from a corresponding gate line to a gate electrode of the TFT, a source signal is applied from a corresponding source line to a source electrode of the TFT, and predetermined charge is written to the pixel electrode through a semiconductor layer and a drain electrode of the TFT. At this time, a potential difference is generated between each pixel electrode of the active matrix substrate 10a and the common electrode of the counter substrate 10b, and a predetermined voltage is applied to the liquid crystal layer. Then, in the display region D of the LCD panel 10, the orientation state of the liquid crystal layer is changed according to the magnitude of the voltage applied to the liquid crystal layer to adjust the light transmittance of the liquid crystal layer, whereby an image is displayed.

As shown in FIG. 1, the viewing angle control panel 20a is, for example, a functional panel including a control substrate 20aa and a counter substrate 20ab, which are positioned so as to face each other, and a liquid crystal layer (not shown) provided between the substrates 20aa and 20ab, for selectively limiting the viewing angle of the LCD panel 10 positioned under the viewing angle control panel 20a.

The control substrate 20aa includes a plurality of control electrodes (not shown) provided in a stripe pattern on an insulating substrate such as a glass substrate so as to extend parallel to each other, and an alignment film (not shown) provided so as to cover the control electrodes.

The counter substrate 20ab includes a common electrode (not shown) provided on an insulating substrate such as a glass substrate, and an alignment film (not shown) provided so as to cover the common electrode.

As shown in FIG. 1, polarizers 22 and 21 for transmitting only polarized components of a specific direction therethrough are attached to the upper and lower surfaces of the viewing angle control panel 20a, respectively, so as to overlap the display region D of the LCD panel 10. Note that the polarizer 21 on the lower surface is formed smaller than the polarizer 22 on the upper surface.

For example, the viewing angle control panel 20a is capable of controlling the viewing angle so as to switch between a first display state where the same signal is input to each control electrode on the control substrate 20aa to apply a fixed voltage to the liquid crystal layer, whereby the whole screen becomes a light transmitting portion, making an image of the display region D of the LCD panel 10 visible at a relatively wide viewing angle, and a second display state where signals that are different in polarity are input to adjacent control electrodes to apply a voltage, which continuously switches between positive and negative values, to the liquid crystal layer, whereby light transmitting portions and light shielding portions are alternately arranged in a stripe pattern on the whole screen, making an image of the display region D of the LCD panel 10 visible at a relatively narrow viewing angle.

As shown in FIG. 1, the spacer 25 is an interposed member provided outside the display region D of the LCD panel 10 so as to be interposed between the LCD panel 10 and the viewing angle control panel 20a to hold both panels 10 and 20a with a predetermined gap therebetween. The spacer 25 is herein made of, for example, silicone rubber with a thickness of about 9 mm, and the gap between the LCD panel 10 and the viewing angle control panel 20a is set to 5 mm to 7 mm Note that the thickness of the polarizers 12a and 21 is about 0.3 mm.

Moreover, as shown in FIG. 2, the spacer 25 is disposed so that its sidewall is in contact with a sidewall of the polarizer 21.

As shown in FIGS. 1 and 2, an adhesive layer 26a, formed by an acrylic double-sided adhesive tape or the like, is provided as an interposed member between the spacer 25 and the viewing angle control panel 20a. Moreover, the spacer 25 and the viewing angle control panel 20a are bonded together by the adhesive layer 26a. Note that the adhesive layer 26a is disposed so that its sidewall is in contact with a sidewall of the polarizer 21, and the thickness of the adhesive layer 26a is about 0.1 mm.

As described above, according to the LCD device 30a of the present embodiment, the spacer 25 and the adhesive layer 26a, which are provided outside the display region D of the LCD panel 10 so as to be interposed between the LCD panel 10 and the viewing angle control panel 20a, are positioned along the sidewall of the polarizer 21 provided on the surface of the viewing angle control panel 20a between the LCD panel 10 and the viewing angle control panel 20a so as to overlap the display region D. Thus, even if the spacer 25 and the adhesive layer 26a are extended and meander due to a temperature change, the respective sidewalls of the spacer 25 and the adhesive layer 26a contacts the sidewall of the polarizer 21, whereby a region where the spacer 25 and the adhesive layer 26a are movable is limited. Thus, since the region where the spacer 25 and the adhesive layer 26a are movable between the LCD panel 10 and the viewing angle control panel 20a is limited to the outside of the polarizer 21, that is, the outside of the display region D, the spacer 25 and the adhesive layer 26a, which are positioned as an interposed member between the LCD panel 10 and the viewing angle control panel 20a, can be prevented from entering the display region D.

Moreover, according to the LCD device 30a of the present embodiment, since the LCD panel 10 and the viewing angle control panel 20a are held at a predetermined gap therebetween by the spacer 25, generation of Newton rings can be suppressed.

Moreover, according to the LCD device 30a of the present embodiment, the spacer 25 and the adhesive layer 26a, which are interposed between the LCD panel 10 and the viewing angle control panel 20a, are in contact with the sidewall of the polarizer 21. Thus, even if the spacer 25 and the adhesive layer 26a are extended and meander due to a temperature change, the spacer 25 and the adhesive layer 26a merely move outward in a direction away from the sidewall of the polarizer 21 provided so as to overlap the display region D, and do not enter the display region D.

Second Embodiment

Figure 3:
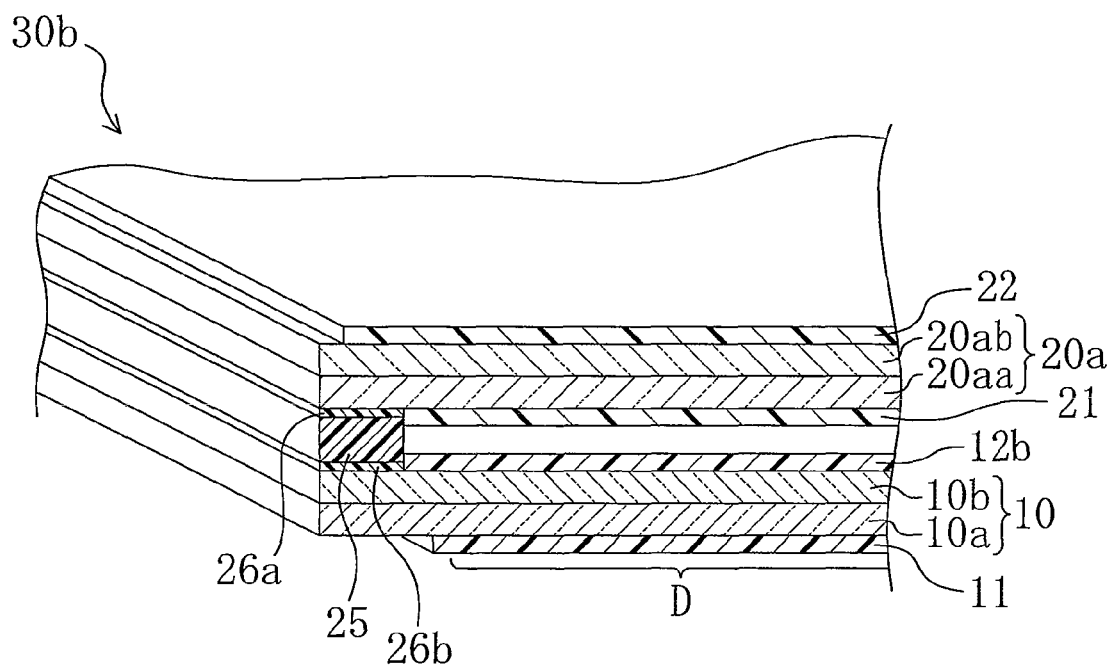
FIG. 3 is a perspective view showing a part of a cross section of an LCD device according to a second embodiment.

FIG. 3 is a perspective view showing a part of a cross section of an LCD device 30b of the present embodiment. Note that, in the following embodiments, the same parts as those of FIGS. 1 and 2 will be denoted with the same reference characters, and detailed description thereof will be omitted.

In the LCD device 30a of the first embodiment, as shown in FIG. 1, the polarizer 12a on the upper surface of the LCD panel 10 is provided on the whole panel surface. However, in the LCD device 30b of the present embodiment, as shown in FIG. 3, a polarizer 12b on the upper surface of the LCD panel 10 is formed with the same size as that of the polarizer 21 on the lower surface of the viewing angle control panel 20a. Moreover, in the LCD device 30b, an adhesive layer 26b, formed by an acrylic double-sided adhesive tape or the like, is provided as an interposed member between the spacer 25 and the LCD panel 10.

According to the LCD device 30b of the present embodiment, the spacer 25 and the adhesive layers 26a and 26b are provided along a sidewall of the polarizer 21 provided on the surface of the LCD panel 10 side of the viewing angle control panel 20a, and a sidewall of the polarizer 12b provided on the surface of the viewing angle control panel 20a side of the LCD panel 10. Thus, even if the spacer 25 and the adhesive layers 26a and 26b are extended and meander due to a temperature change, the respective sidewalls of the spacer 25 and the adhesive layers 26a and 26b contacts the sidewalls of the polarizers 21 and 12b provided on the respective surfaces of the viewing angle control panel 20a and the LCD panel 10, whereby the spacer 25 and the adhesive layers 26a and 26b can be prevented from entering the display region D.

Third Embodiment

Figure 4:
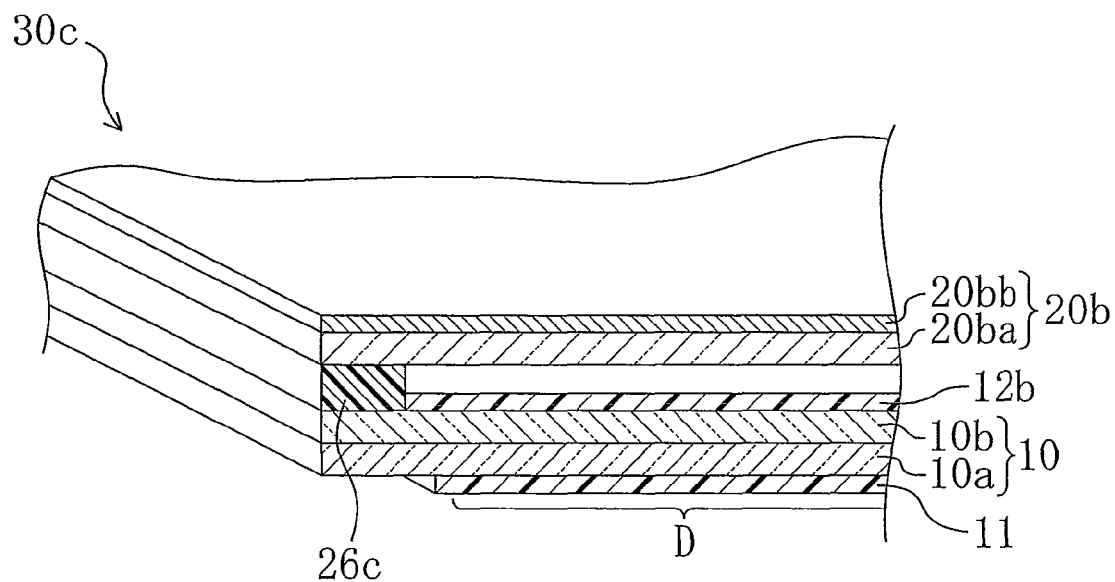
FIG. 4 is a perspective view showing a part of a cross section of an LCD device according to a third embodiment.

FIG. 4 is a perspective view showing a part of a cross section of an LCD device 30c of the present embodiment.

Although the LCD devices 30a and 30b having the viewing angle control panel 20a as a functional panel are shown as an example in the above embodiments, the present embodiment will be described with respect to an LCD device 30c having a touch panel as a functional panel.

As shown in FIG. 4, the LCD device 30c includes an LCD panel 10 having a display region D for displaying an image, a touch panel 20b positioned so as to face the LCD panel 10, and an adhesive layer 26c provided outside the display region D so as to be interposed between the LCD panel 10 and the touch panel 20b.

As shown in FIG. 4, the touch panel 20b includes an insulating substrate 20ba such as a glass substrate, and a touch element layer 20bb provided on the insulating substrate 20ba.

The touch element layer 20bb includes a touch electrode (not shown) provided in a rectangular shape, four extended wirings (not shown) respectively extending from four corners of the touch electrode, and a protective layer (not shown) provided so as to cover the touch electrode and the like.

The touch panel 20b is configured so that, when the surface of the touch electrode is touched through the protective layer, the touch electrode is grounded through electrostatic capacitance of a human body at the touched point, whereby the resistance value between the four corners of the touch electrode and the grounded point changes, and the touched position is detected based on the change.

As shown in FIG. 4, the adhesive layer 26c, formed by an acrylic double-sided adhesive tape or the like, is provided as an interposed member between the LCD panel 10 and the touch panel 20b. The LCD panel 10 and the touch panel 20b are bonded together by the adhesive layer 26c. The adhesive layer 26c is disposed so that its sidewall is in contact with a sidewall of the polarizer 12b, and the thickness of the adhesive layer 26c is about 1 mm. Moreover, the adhesive layer 26c is formed so that the gap between the LCD panel 10 and the touch panel 20b becomes 0.5 mm, and functions also as the spacer 25 of the above embodiments.

According to the LCD device 30c of the present embodiment, the adhesive layer 26c is provided along the sidewall of the polarizer 12b provided on the surface of the touch panel 20b side of the LCD panel 10. Thus, even if the adhesive layer 26c is extended and meanders due to a temperature change, the sidewall of the adhesive layer 26c contacts the sidewall of the polarizer 12b provided on the surface of the LCD panel 10, whereby the adhesive layer 26c can be prevented from entering the display region D.

Although a viewing angle control panel and a touch panel are shown as examples of a functional panel in the above embodiments, another LCD panel for displaying a different image from that of the lower-side LCD panel can be used as a functional panel in the present invention.

Moreover, although a polarizer having optical characteristics of transmitting only polarized components of a specific direction is shown as an example of an optical sheet in the above embodiments, the present invention is applicable also to, for example, an antireflection film (sheet) or the like which is provided on the lower surface of a touch panel or the like.

Moreover, although an active matrix driving LCD panel is shown as an example in the above embodiments, the present invention is applicable also to LCD panels of other driving types, and other display panels such as EL (electroluminescence) display panels.

INDUSTRIAL APPLICABILITY

As described above, since the present invention can prevent an interposed member positioned between a display panel and a functional panel from entering a display region, the present invention is useful for display devices having a plurality of panels.

The invention claimed is:
1. A display device, comprising:
a display panel having a display region for displaying an image;
a functional panel positioned so as to face the display panel; and
an interposed member provided outside the display region so as to be interposed between the display panel and the functional panel, wherein
an optical sheet having predetermined optical characteristics is provided on at least one surface between the display panel and the functional panel so as to overlap the display region,
the interposed member is provided along a sidewall of the optical sheet, and the interposed member has a thickness that exceeds a thickness of the optical sheet.

2. A display device, comprising:

a display panel having a display region for displaying an image;

a functional panel positioned so as to face the display panel; and an interposed member provided outside the display region so as to be interposed between the display panel and the functional panel, wherein an optical sheet having predetermined optical characteristics is provided on at least one surface between the display panel and the functional panel so as to overlap the display region, the interposed member is provided along a sidewall of the optical sheet, the functional panel is a touch panel for detecting a touched position on the display panel, and the optical sheet is a polarizer provided on a surface of the display panel.

3. A display device, comprising:

a display panel having a display region for displaying an image;

a functional panel positioned so as to face the display panel; and an interposed member provided outside the display region so as to be interposed between the display panel and the functional panel, wherein an optical sheet having predetermined optical characteristics is provided on at least one surface between the display panel and the functional panel so as to overlap the display region, the interposed member is provided along a sidewall of the optical sheet, the functional panel is a viewing angle control panel for controlling a viewing angle of the display panel, and the optical sheet is a polarizer provided on a surface of the viewing angle control panel.

4. A display device, comprising:

a display panel having a display region for displaying an image;

a functional panel positioned so as to face the display panel; and an interposed member provided outside the display region so as to be interposed between the display panel and the functional panel, wherein an optical sheet having predetermined optical characteristics is provided on at least one surface between the display panel and the functional panel so as to overlap the display region, the interposed member is provided along a sidewall of the optical sheet, and a polarizer is provided as the optical sheet on a surface of the display panel.

5. The display device of claim 1, wherein
the interposed member is an adhesive layer for bonding the display panel and the functional panel together.

6. The display device of claim 1, wherein
the interposed member is a spacer for holding the display panel and the functional panel with a predetermined gap therebetween.

7. The display device of claim 1, wherein
a sidewall of the interposed member is in contact with the sidewall of the optical sheet.

8. The display device of claim 1, wherein the optical sheet is a polarizer.

9. The display device of claim 1, wherein the optical sheet is an antireflection film.

10. The display device of claim 1, wherein the functional panel is a touch panel.

11. The display device of claim 1, wherein the functional panel is a viewing angle control panel.

* * * * *